United States Patent
Park et al.

(10) Patent No.: US 10,034,242 B2
(45) Date of Patent: Jul. 24, 2018

(54) METHOD AND APPARATUS FOR POWER SAVE MODE OPERATION ON BASIS OF FRAME TRANSMITTED FROM ANOTHER BSS IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,667

(22) PCT Filed: Jun. 10, 2015

(86) PCT No.: PCT/KR2015/005846
§ 371 (c)(1),
(2) Date: Jan. 6, 2017

(87) PCT Pub. No.: WO2016/006830
PCT Pub. Date: Jan. 14, 2016

(65) Prior Publication Data
US 2017/0208546 A1 Jul. 20, 2017

Related U.S. Application Data

(60) Provisional application No. 62/021,707, filed on Jul. 8, 2014.

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0055* (2013.01); *H04L 12/1886* (2013.01);
(Continued)

(58) Field of Classification Search
CPC ............. H04L 5/0055; H04L 12/1886; H04W 52/0229; H04W 72/042; H04W 52/0216
See application file for complete search history.

(56) References Cited

U.S. PATENT DOCUMENTS

2007/0238438 A1* 10/2007 Alon ................. H04W 52/0225
455/343.2
2010/0214942 A1* 8/2010 Du ...................... H04L 43/0876
370/252
(Continued)

FOREIGN PATENT DOCUMENTS

| JP | 2013168792 | 8/2013 |
|----|------------|--------|
| JP | 2013236274 | 11/2013 |

(Continued)

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.5.8.3., pp. 199-800 (3 pages provided).

(Continued)

*Primary Examiner* — Chi H Pham
*Assistant Examiner* — Weibin Huang
(74) *Attorney, Agent, or Firm* — Lee, Hong, Degerman, Kang & Waimey

(57) ABSTRACT

Disclosed are a method and an apparatus for power save mode operation on the basis of a frame transmitted from another BSS in a wireless LAN. A method for operating an
(Continued)

STA in a wireless LAN in a power save mode comprises: a step in which the STA receives a beacon frame from an AP, the beacon frame comprising a TIM element indicating downlink data pending in the STA; a step in which the STA transmits a PS-poll frame to the AP in response to the beacon frame; a step in which the STA receives, from the AP, an ACK frame transmitted by the AP in response to the PS-poll frame; and a step in which the STA determines the operation of the another BSS in a TXOP power save mode on the basis of the ACK frame.

10 Claims, 14 Drawing Sheets

(51) Int. Cl.
*H04W 72/04* (2009.01)
*H04L 12/18* (2006.01)
*H04W 84/12* (2009.01)

(52) U.S. Cl.
CPC ..... *H04W 52/0229* (2013.01); *H04W 72/042* (2013.01); *H04W 84/12* (2013.01)

(56) References Cited

U.S. PATENT DOCUMENTS

| | | | | |
|---|---|---|---|---|
| 2012/0188923 | A1* | 7/2012 | Kwon | H04W 52/0212 370/311 |
| 2014/0153415 | A1* | 6/2014 | Choudhury | H04W 72/0446 370/252 |
| 2015/0055577 | A1* | 2/2015 | Han | H04W 88/08 370/329 |
| 2015/0173015 | A1* | 6/2015 | Lee | H04W 52/0216 370/311 |
| 2015/0245292 | A1 | 8/2015 | Jeong et al. | |
| 2016/0249383 | A1* | 8/2016 | Kwon | H04W 72/04 |
| 2016/0330788 | A1* | 11/2016 | Zheng | H04W 28/0205 |

FOREIGN PATENT DOCUMENTS

| | | |
|---|---|---|
| KR | 1020120086110 A | 8/2012 |
| KR | 1020130139761 A | 12/2013 |
| KR | 1020140008261 A | 1/2014 |
| KR | 20140038254 | 3/2014 |
| KR | 20140054071 | 5/2014 |
| WO | 2014084495 A1 | 6/2014 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REV™/D12, Nov. 2011, section 8.3.3.5.-8.3.3.6., pp. 467-468 (3 pages provided).
PCT International Application No. PCT/KR2015/005846, International Search Report dated Aug. 31, 2015, 2 pages.
Korean Intellectual Property Office Application Serial No. 10-2016-7036888, Notice of Allowance dated Jan. 25, 2018, 2 pages.
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.2., pp. 463-467 (6 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.5.8.3., pp. 799-800 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477 (5 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.11., pp. 478-479 (3 pages provided).

* cited by examiner

FIG. 1
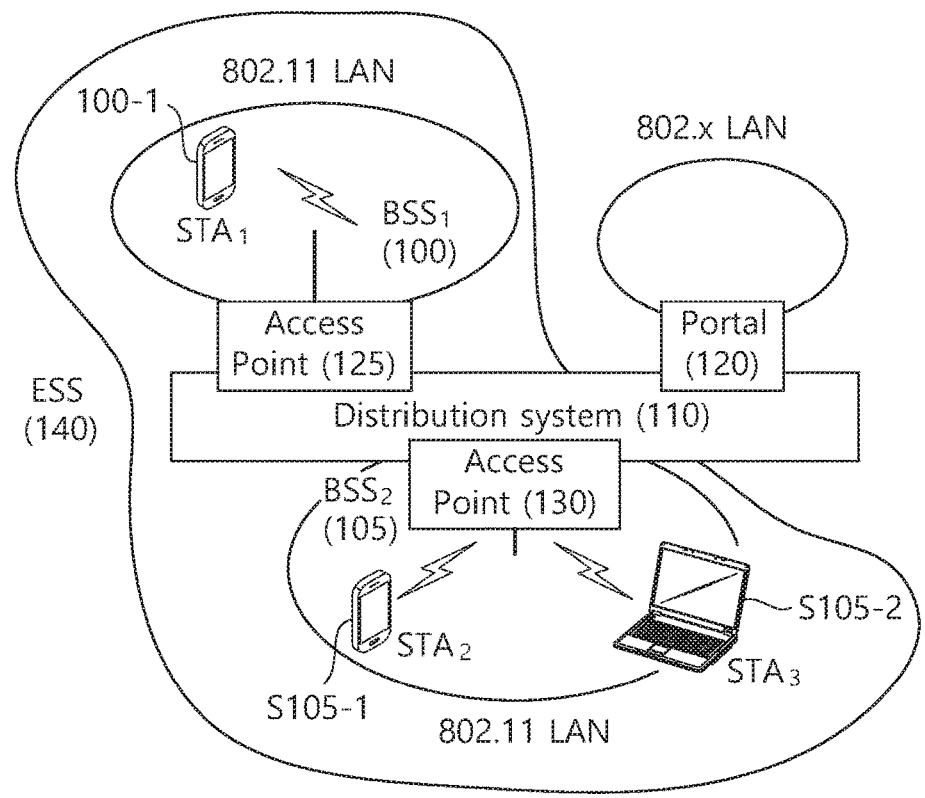
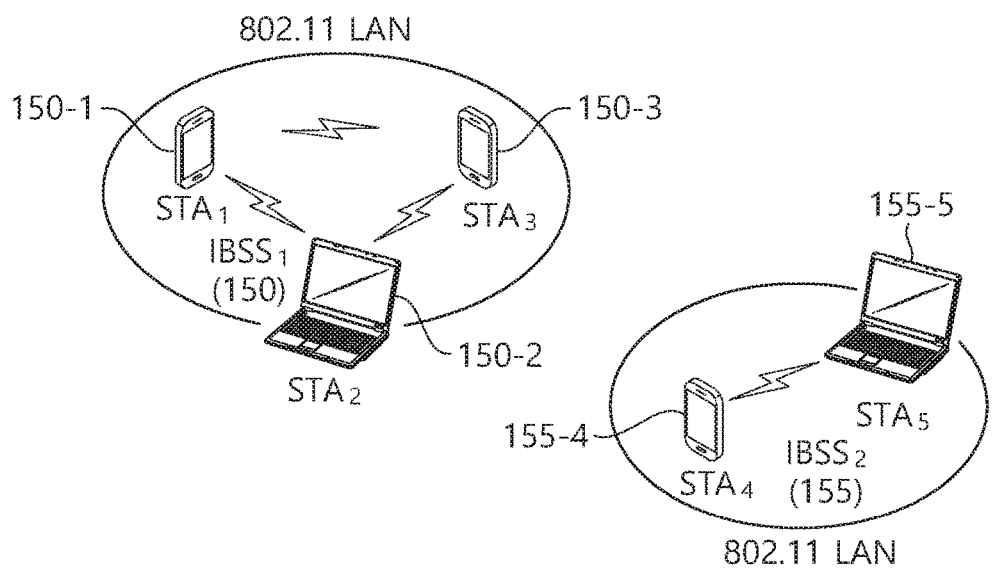

FIG. 10
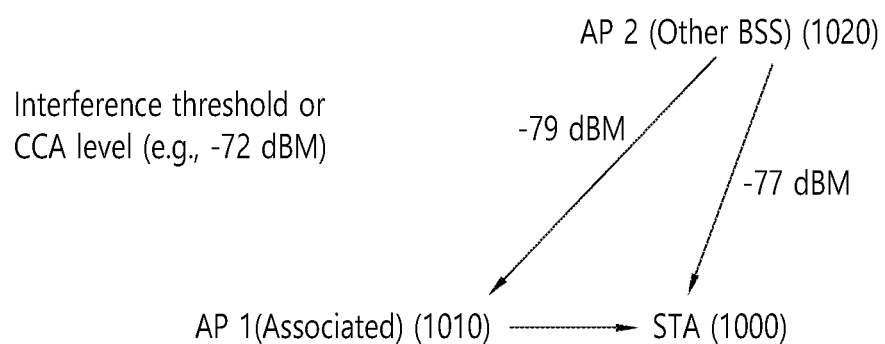
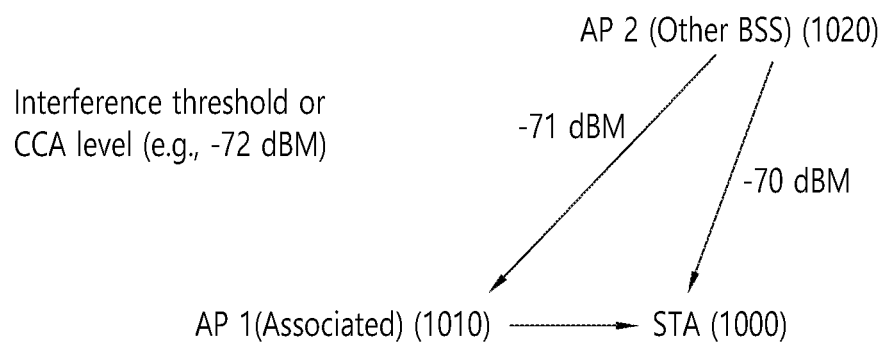

METHOD AND APPARATUS FOR POWER SAVE MODE OPERATION ON BASIS OF FRAME TRANSMITTED FROM ANOTHER BSS IN WIRELESS LAN

CROSS-REFERENCE TO RELATED APPLICATIONS

This application is the National Stage filing under 35 U.S.C. 371 of International Application No. PCT/KR2015/005846, filed on Jun. 10, 2015, which claims the benefit of U.S. Provisional Application No. 62/021,707, filed on Jul. 8, 2014, the contents of which are all hereby incorporated by reference herein in their entirety.

BACKGROUND OF THE INVENTION

Field of the Invention

The present invention relates to wireless communication and, most particularly, to a method and apparatus for a power save mode operation on the basis of a frame transmitted from another BSS in a wireless LAN.

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

Technical Objects

An object of the present invention is to provide a method for a power save mode operation on the basis of a frame transmitted from another BSS in a wireless LAN.

Another object of the present invention is to provide an apparatus for a power save mode operation on the basis of a frame transmitted from another BSS in a wireless LAN.

Technical Solutions

In order to achieve the above-described technical object of the present invention, according to an aspect of the present invention, a method for a power save mode operation of a station (STA) in a wireless LAN may include the steps of receiving, by the STA, a beacon frame from an access point (AP), the beacon frame including a traffic indication map (TIM) element indicating downlink data pending in the STA, transmitting, by the STA, a power saving (PS)-poll frame to the AP as a response to the beacon frame, receiving, by the STA, an acknowledgement (ACK) frame transmitted from the AP as a response to the PS-poll frame, and determining, by the STA, another basic service set (BSS) transmission opportunity (TXOP) power save mode operation based on the ACK frame, wherein the PS-poll frame may include information on a downlink measurement value corresponding to the beacon frame and information on a capability of the other BSS TXOP power save mode operation of the STA, wherein the ACK frame may include information on whether or not the other BSS TXOP power save mode operation of the STA is authorized, the information being determined based on the information on the downlink measurement value and the information on the capability of the other BSS TXOP power save mode operation of the STA, and wherein the other BSS TXOP power save mode operation may determine a transition of the STA to an awake state or a doze state based on another BSS frame transmitted by another STA or another AP being included in another BSS, wherein the other BSS does not include the STA and the AP.

In order to achieve the above-described technical object of the present invention, according to another aspect of the present invention, a station (STA) operating based on a power save mode operation in a wireless LAN may include a radio frequency (RF) unit configured to transmit or receive radio signals, and a processor being operatively connected to the RF unit, wherein the processor may be configured to receive a beacon frame from an access point (AP), the beacon frame including a traffic indication map (TIM) element indicating downlink data pending in the STA, to transmit a power saving (PS)-poll frame to the AP as a response to the beacon frame, to receive an acknowledgement (ACK) frame transmitted from the AP as a response to the PS-poll frame, and to determine another basic service set (BSS) transmission opportunity (TXOP) power save mode operation based on the ACK frame, wherein the PS-poll frame may include information on a downlink measurement value corresponding to the beacon frame and information on a capability of the other BSS TXOP power save mode operation of the STA, wherein the ACK frame may include information on whether or not the other BSS TXOP power save mode operation of the STA is authorized, the information being determined based on the information on the downlink measurement value and the information on the capability of the other BSS TXOP power save mode operation of the STA, and wherein the other BSS TXOP power save mode operation may determine a transition of the STA to an awake state or a doze state based on another BSS frame transmitted by another STA or another AP being included in another BSS, wherein the other BSS does not include the STA and the AP.

EFFECTS OF THE INVENTION

An STA operating in an active mode may be shifted to a doze state based on whether or not a received frame corresponds to a frame transmitted by another BSS. Accordingly, the power of the STA may be saved, and operation time of the STA operating on battery power may be extended.

BRIEF DESCRIPTION OF THE DRAWINGS

FIG. 1 is a conceptual view illustrating the structure of a wireless local area network (WLAN).

FIG. 10 is a conceptual view illustrating operations in another BSS TXOP power save mode of the STA according to an interference threshold value according to an exemplary embodiment of the present invention.

DESCRIPTION OF EXEMPLARY EMBODIMENTS

Figure 2:
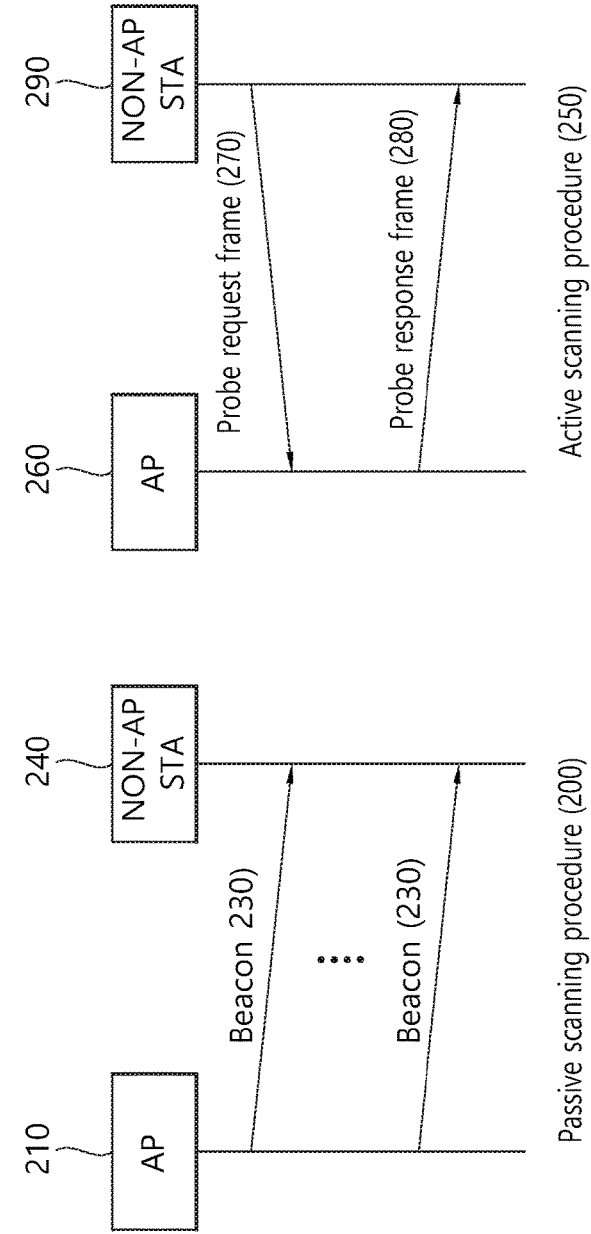
FIG. 2 is a conceptual view illustrating a scanning method in a wireless LAN.

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmbTM/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
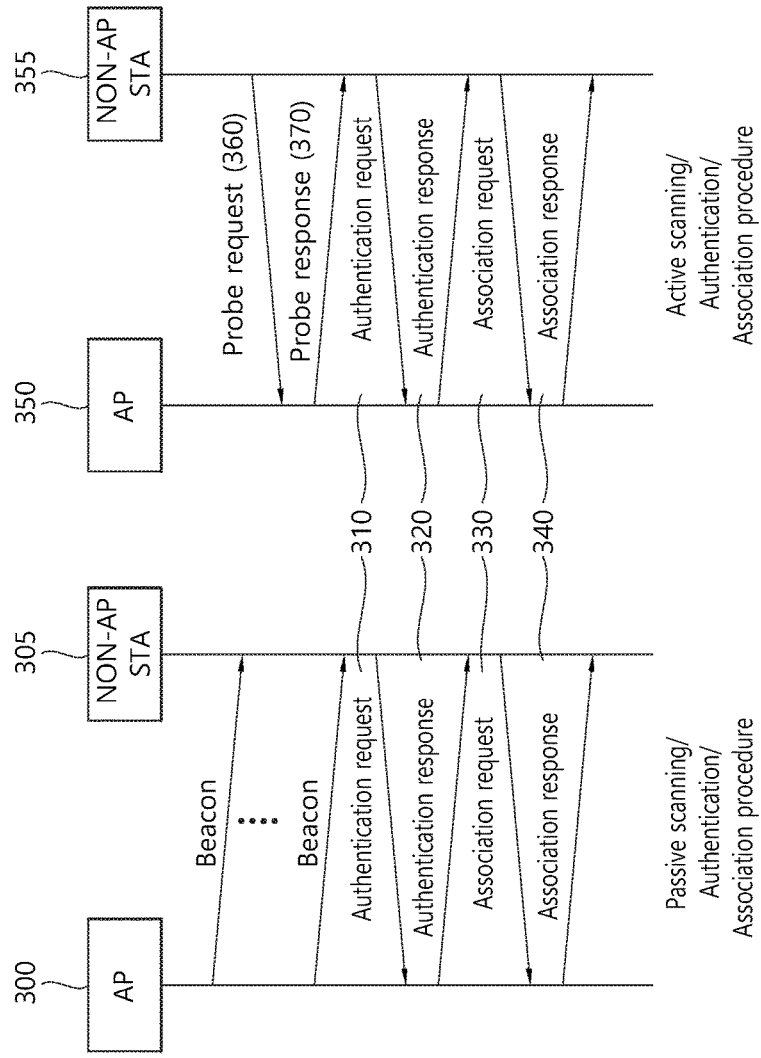
FIG. 3 is a conceptual view illustrating an authentication procedure and an association procedure being performed after the scanning procedure of the AP and the STA.

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA may operate based on two operating modes (or states), i.e., an active mode (awake state) and a sleep mode (doze state) to save power consumption. An STA support the power save mode by operating the awake state or the doze state.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
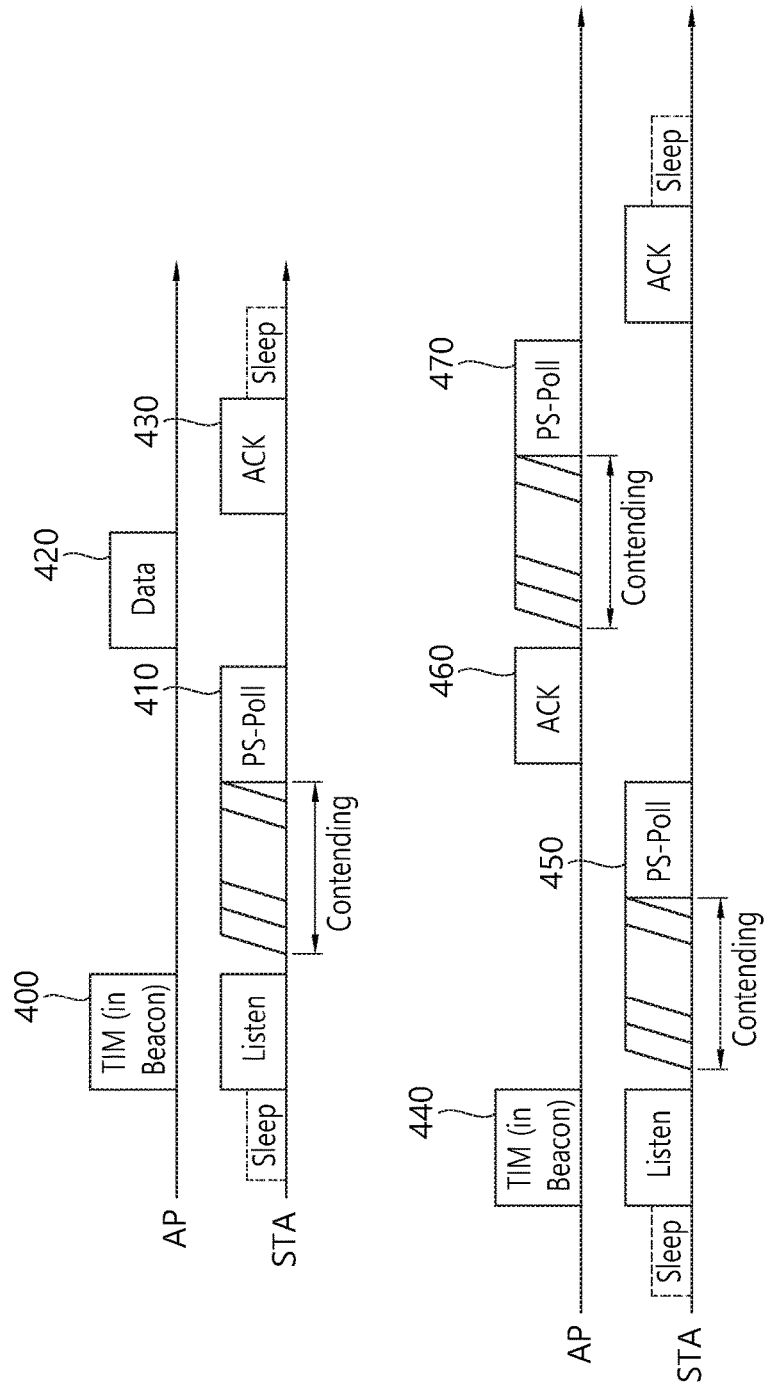
FIG. 4 is a conceptual view illustrating a power save method based on a beacon frame.

FIG. 4 is a conceptual view illustrating a power save method based on a beacon frame.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap.

The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
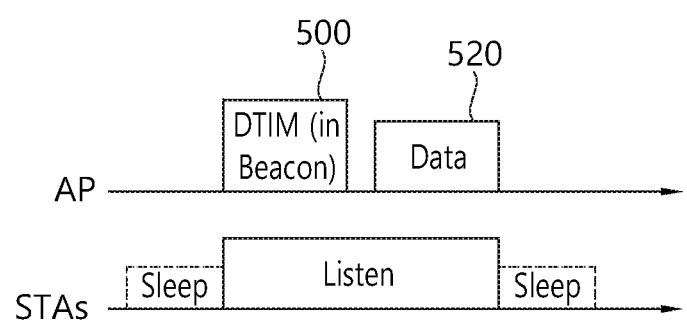
FIG. 5 is a conceptual view illustrating a power save method based on a beacon frame.

FIG. 5 is a conceptual view illustrating a power save method based on a beacon frame.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame

520. The AP may transmit the downlink frame 520 to the STA by using the multicast method or the broadcast method.

Hereinafter, in the exemplary embodiment of the present invention, the transmission from the AP to the STA may also be expressed by using the term downlink transmission. Each of the PPDU, frame, and data being transmitted via downlink transmission may be respectively expressed by using the terms downlink PPDU, downlink frame, and downlink data. The PPDU may correspond to a data unit including a PPDU header, and a physical layer service data unit (PSDU) (or MAC protocol data unit (MPDU)). The PPDU header may include a PHY header and a PHY preamble, and the PSDU (or MPDU) may include a frame or may indicate a frame. The PHY header may also be expressed differently by using the term physical layer convergence protocol (PLCP) header, and the PHY preamble may also be expressed differently by using the term PLCP preamble.

Additionally, the transmission from the STA to the AP may also be expressed by using the term uplink transmission. Each of the PPDU, frame, and data being transmitted via uplink transmission may be respectively expressed by using the terms uplink PPDU, uplink frame, and uplink data.

In a wireless LAN, the STA may not only be operated based on the above-described TIM-based power save mode but may also be operated based on a TXOP power save mode, which corresponds to a power save mode that is based on the TXOP.

A power management mode of the STA may be divided into an active mode and a power save mode. The above-described TIM-based power save mode corresponds to one of the power save modes.

Additionally, in case a medium occupancy for a frame transmission of another STA occurs, the STA operating in the TXOP power save mode may be shifted to a doze state during a TXOP duration (or a TXOP duration that is configured for a frame of another STA) for the frame transmission of the other STA.

The STA operating in the conventional TXOP power save mode may receive a downlink frame from the associated AP and may determine whether to shift to the doze state or to maintain the awake state based on a group identifier (Group ID) and a partial association identifier (PAID) being included in a PHY header (or PLCP header) of the downlink PPDU that has carried the downlink frame.

For example, in case the group ID being included in the PHY header of the received downlink PPDU is not identical to (or does not match with) a group ID of the STA, the STA may be shifted to the doze state. Additionally, even though the group ID included in PHY header of the received downlink PPDU is identical to the group ID of the STA, in case the PAID included in the PHY header of the downlink PPDU is not identical to the PAID of the STA, the STA may be shifted to the doze state.

The STA operating in the conventional TXOP power save mode was shifted from the awake state to the doze state only in the case when the received frame corresponds to a frame being transmitted by an AP that is associated with the STA (or a non-AP STA, AP being included in a BSS including the AP.

In the exemplary embodiment of the present invention, in case the STA receives a frame (or PPDU), which is transmitted from another BSS (or a non-AP STA or STA being included in another BSS), a power save mode supporting the transition of the STA to the doze state is initiated. Such power save mode may also be expressed by the term other BSS TXOP power save mode (or 11ax TXOP power save mode).

Figure 6:
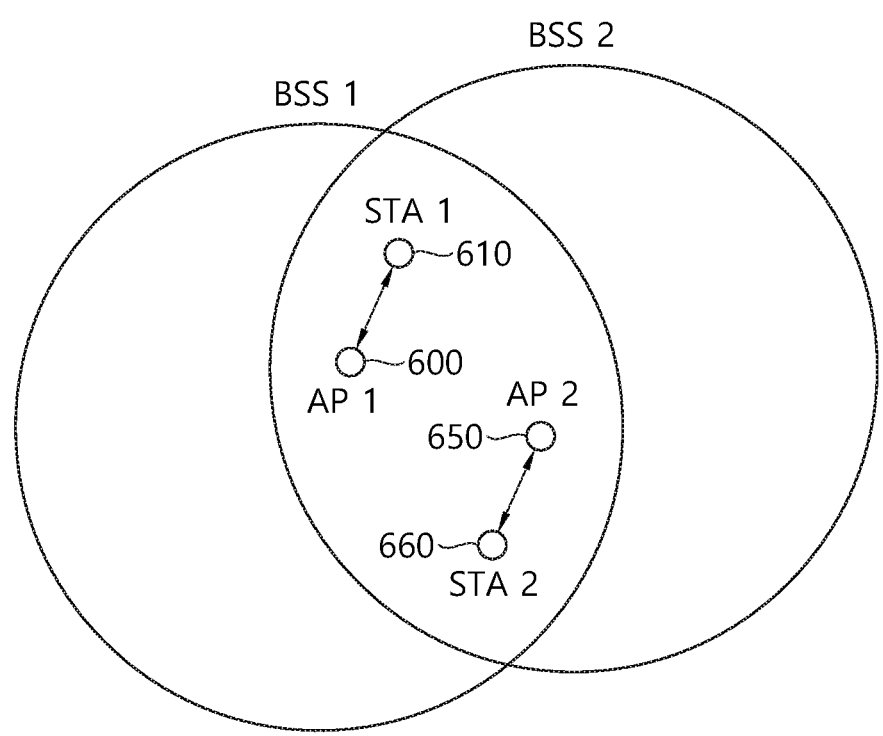
FIG. 6 is a conceptual view illustrating another BSS TXOP power save mode according to an exemplary embodiment of the present invention.

FIG. 6 is a conceptual view illustrating another BSS TXOP power save mode according to an exemplary embodiment of the present invention.

FIG. 6 discloses a transition method of the STA to the doze state, in case the STA and the AP respectively receive a frame being transmitted by different BSSs. The frame that is transmitted from another BSS may correspond to a frame that is transmitted by another AP or another STA, which is included in another BSS other than the BSS in which the current STA is included.

Referring to FIG. 6, STA1 610 and AP1 600 may be included in BSS1, and STA2 660 and AP2 650 may be included in BSS2. Herein, BSS2 may correspond to an overlapped basic service set (OBSS) corresponding to BSS1.

STA1 610 may receive interference from a frame transmitted from BSS2. The frame transmitted from BSS2 may include a downlink frame being transmitted to STA2 660 by AP2 650 or an uplink frame being transmitted to AP2 650 by STA2 660.

According to the exemplary embodiment of the present invention, in case the reception intensity of each of AP1 600 and STA1 610 for receiving the frame being transmitted from BSS2 belong to a similar range (or in case AP1 600 and STA1 610 are adjacent to one another within less than a threshold distance), STA1 may operate in the power save mode based on the frame being transmitted by BSS2.

For example, the reception intensity of the frame being transmitted by BSS2, which is received by AP1, may be equal to or greater than a predetermined reception intensity level. If AP1 can predict that STA1 will also receive a frame transmitted by BBS2 at a reception intensity within a similar range, AP1 may predict an interference of a frame corresponding to STA1 that is transmitted by AP1. Therefore, AP1 may not transmit a downlink frame to STA1.

Conversely, the reception intensity of the frame being transmitted by BSS2, which is received by STA1, may be equal to or greater than a predetermined reception intensity level. If STA1 can predict that AP1 will also receive a frame transmitted by BBS2 at a reception intensity within a similar range, STA1 may predict an interference of a frame corresponding to AP1 that is transmitted by STA1. Therefore, STA1 may not transmit an uplink frame to AP1.

More specifically, if STA1 and AP1 can verify the reception of a frame being transmitted by another BSS at a reception intensity within a similar range (or in case STA1 and AP1 are located within a close range less than or equal to a threshold distance), STA1 may operate in another BSS TXOP power save mode, which corresponds to a power save mode that is based on a transmission intensity of another BSS frame.

Alternatively, if STA1 and AP1 can verify the reception of a frame being transmitted by another BSS at a reception intensity within a similar range (or in case STA1 and AP1 are located within a close range less than or equal to a threshold distance), STA1 may operate in another BSS TXOP power save mode without considering the transmission intensity of another BSS frame and by only considering whether or not another BSS frame has been transmitted.

Hereinafter, a preliminary negotiation procedure between an AP and an STA for allowing the STA to operate in another BBS TXOP power save mode is disclosed in the exemplary embodiment of the present invention. In order to allow the STA to operate in another BBS TXOP power save mode, whether or not the STA is to be operated in the other BBS TXOP power save mode may be negotiated in advance with the AP. In case the operation of the STA in the other BBS TXOP power save mode is negotiated with the AP, the STA may be operated in the other BBS TXOP power save mode based on the reception of another BBS frame.

Figure 7:
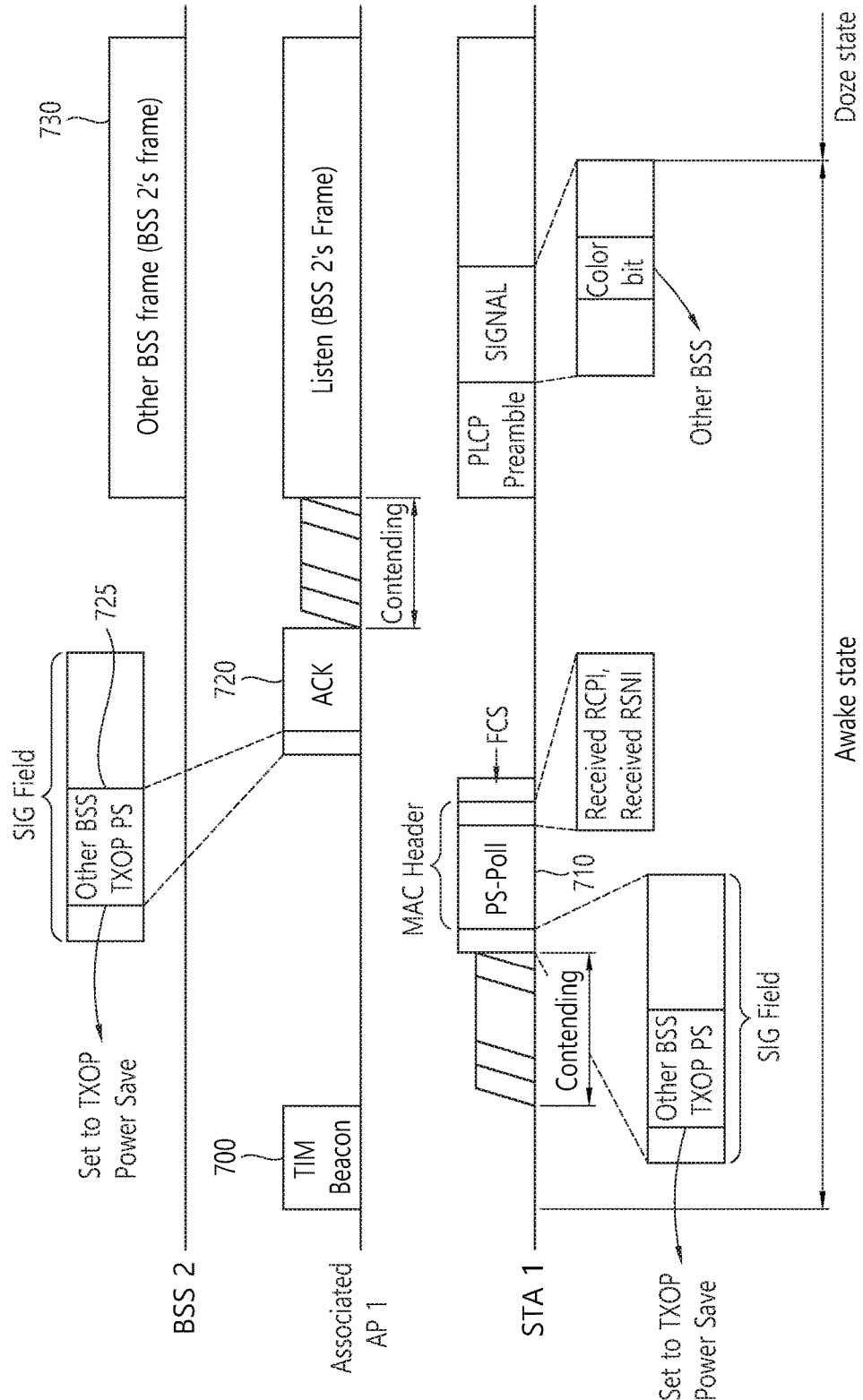
FIG. 7 is a conceptual view illustrating a preliminary procedure for another BSS TXOP power save mode of the STA according to an exemplary embodiment of the present invention.

FIG. 7 is a conceptual view illustrating a preliminary procedure for another BSS TXOP power save mode of the STA according to an exemplary embodiment of the present invention.

Referring to FIG. 7, the STA is associated with the AP and may be operated in the TIM-based power save mode.

The STA verifies a TIM element of a beacon frame 700 being transmitted by the AP and may determine the presence or absence of downlink data pending in the STA. In case the TIM element indicates the presence of the downlink data pending in the STA, the STA may transmit a PS-poll frame 710 and may request the transmission of a downlink frame including downlink data pending in the AP.

According to the exemplary embodiment of the present invention, the PS-Poll frame 710 that is transmitted by the STA may include information related to the reception intensity of a downlink frame, which is being transmitted by the AP. The information related to the reception intensity of the downlink frame may correspond to a downlink (DL) measurement value. The DL measurement value may include a received channel power indicator (RCPI) and a received signal to noise indicator (RSNI) corresponding to a downlink signal.

The RCPI may indicate an overall channel power (signal, noise, interference) of the received frame.

The RSNI may indicate a ratio between a signal and noise+interference in the received frame. The RSNI may indicate a ratio of noise+interference power (average noise power indicator (ANPI)) in the received signal power (RCPI-ANPI).

The downlink measurement value that is included in the PS-poll frame 710 may correspond to RCPI and RSNI values corresponding to the beacon frame 700, which triggered the transmission of the PS-poll frame 710. Alternatively, the downlink measurement value may also correspond to the RCPI and RSNI values corresponding to the previous downlink frame (e.g., an average value of the RCPI and RSNI values corresponding to the previous downlink frame). For example, the downlink measurement value may be included in a downlink measurement field of the PS-poll frame and may then be transmitted.

The AP may determine whether or not the reception intensity of the frame transmitted by the other BSS that is to be received by the STA and the reception intensity of the frame transmitted by the other BSS that is to be received by the AP are within a similar range that is adequate for performing the other BSS TXOP power save mode operation of the STA, based on the information on the downlink measurement value, which is included in the PS-poll frame 710. In other words, the AP may determine whether or not a location of the STA and a location of the AP are within a similar range that is adequate for performing the other BSS TXOP power save mode operation of the STA, based on the information on the downlink measurement value, which is included in the PS-poll frame 710.

Hereinafter, a frame that is transmitted by another BSS may be expressed by the term other BSS frame 730. Also, for simplicity in the description, a unit of a signal triggering the other BSS TXOP power save mode of the STA is expressed by the term other BSS frame 730. However, hereinafter, the other BSS frame 730 may also be expressed and interpreted by the term other BSS PPDU indicating a PPDU delivering the other BSS frame 730.

Additionally, the PS-poll frame 710 may include another BSS TXOP power save mode field 715, which indicates whether or not the STA is to be operated in the other BSS TXOP power save mode. The other BSS TXOP power save mode field 715 may also be expressed by the term other BSS NO TXOP field.

For example, in case the other BSS TXOP power save mode field 715 included in the PS-poll frame 710 is equal to 0, this may indicate that the STA does not operate in the other BSS TXOP power save mode. Conversely, in case the other BSS TXOP power save mode field 715 included in the PS-poll frame 710 is equal to 1, this may indicate that the STA is operated in the other BSS TXOP power save mode.

More specifically, the STA may set the other BSS TXOP power save mode field 715 included in the PS-poll frame 710 to 1, and this may indicate the STA to be operated by transitioning from the awake state to the doze state during a duration, which is configured by the other BSS frame (e.g., duration of a duration field of another BSS frame) when receiving the other BSS frame 730. At this point, by considering the reception intensity of the other BSS frame 730, the STA may be operated by transitioning from the awake state to the doze state during a duration, which is configured by the other BSS frame 730, only in a case when the reception intensity of the BSS frame 730 is equal to or greater than a predetermined size.

Conversely, the STA may set the other BSS TXOP power save mode field 715 included in the PS-poll frame 710 to 0, and this may indicate the STA to be operated in a power save mode (or active mode) that does not consider the reception or non-reception of the other BSS frame 730.

The AP may receive the PS-poll frame 710, which includes information on the downlink measurement value being transmitted by the STA and information on the other BSS TXOP power save mode. The AP may determine whether or not the STA is to be operated in the other BSS TXOP power save mode based on the information on the downlink measurement value and the information on the other BSS TXOP power save mode of the PS-poll frame 710, which is transmitted by the STA.

For example, in case the downlink measurement value transmitted by the STA through the PS-poll frame 710 is equal to or greater than a threshold value, and in case the operation of the STA in the other BSS TXOP power save mode is indicated based on the PS-poll frame 710, the AP may authorize the operation of the STA to the other BSS TXOP power save mode. Conversely, in case the downlink measurement value transmitted by the STA through the PS-poll frame 710 is smaller than the threshold value, or in case the operation of the STA in the other BSS TXOP power save mode is not indicated based on the PS-poll frame 710, the AP may not authorize the operation of the STA to the other BSS TXOP power save mode. More specifically, even though the operation of the STA in the other BSS TXOP power save mode is indicated, in case the downlink measurement value being transmitted by the STA is smaller than the threshold value, the AP may not authorize the operation of the STA to the other BSS TXOP power save mode.

The AP may transmit information on whether or not the operation of the STA in the other BSS TXOP power save mode is authorized based on an ACK frame 720, which is transmitted as a response to the PS-poll frame 710.

For example, the ACK frame 720, which is transmitted by the AP as a response to the PS-poll frame 710, may include another BSS TXOP power save mode field (or other BSS NO TXOP field) 725. In case the other BSS TXOP power save mode field 725 included in the ACK frame 720 is set to 1, this may indicate authorization of the operation of the STA in the other BSS TXOP power save mode. Conversely, in case the other BSS TXOP power save mode field 725 included in the ACK frame 720 is set to 0, this may indicate non-authorization of the operation of the STA in the other BSS TXOP power save mode.

By performing the above-described exchange of the PS-poll frame 710 and the ACK frame 720 as a response to the PS-poll frame 710, whether or not the STA is to be operated in the other BSS TXOP power save mode may be negotiated.

A case when the AP authorizes the operation of the STA in the other BSS TXOP power save mode based on the ACK frame 720 is assumed in FIG. 7.

After authorizing the operation of the STA in the other BSS TXOP power save mode by transmitting the ACK frame 720 to the STA, the AP may receive another BSS frame 730. The AP may determine whether or not the received frame corresponds to the other BSS frame 730 based on a BSS color bit, which is included in a PPDU header of a PPDU carrying the received frame. The BSS color bit may include information for indicating a BSS that has transmitted a PPDU (or frame). For example, in case the BSS color bit included in the PPDU header indicates another BSS, the AP may determine the frame being transmitted through the PPDU as the other BSS frame 730.

Similarly, the STA may also determine whether or not the received frame corresponds to the other BSS frame 730 based on a BSS color bit, which is included in a PPDU header of a PPDU carrying the received frame. In case the transmission of another BSS frame 730 is sensed, the STA may be transitioned to the doze state during a time corresponding to a transmission duration by considering a transmission duration, which is configured based on the other BSS frame 730, and power consumption according to the transition to the doze state may be reduced.

According to another exemplary embodiment of the present invention, the STA operating in the other BSS TXOP power save mode may be transitioned from the awake state to the doze state only in a case when the reception intensity of the received other BSS frame 730 is equal to or greater than a predetermined intensity level. In case the reception intensity of the received other BSS frame 730 is smaller than the predetermined intensity level, the STA may not be transitioned to the doze state. The AP may determine the state of the STA to be in the awake state (i.e., non-transition to the doze state) only in the case when the reception intensity of the other BSS frame 730 is smaller than the predetermined intensity level, and the AP may then transmit a downlink frame to the STA. Conversely, in case the reception intensity of the received other BSS frame 730 is equal to or greater than the predetermined intensity level, the STA may be transitioned to the doze state. In case the reception intensity of the received other BSS frame 730 is equal to or greater than the predetermined intensity level, the AP may also determine the state of the STA to be in the doze state, and the AP may then transmit a downlink frame to the STA.

Figure 8:
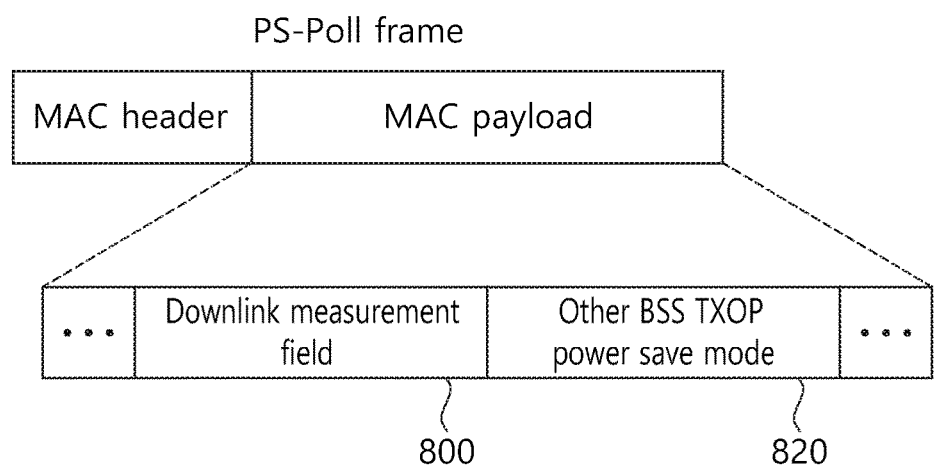
FIG. 8 is a conceptual view illustrating a PS-poll frame according to an exemplary embodiment of the present invention.

FIG. 8 is a conceptual view illustrating a PS-poll frame according to an exemplary embodiment of the present invention.

FIG. 8 discloses a PS-poll frame including information on a downlink measurement value and information on another BSS TXOP power save mode as a separate field in a MAC payload. However, the information on the downlink measurement value and the information on the other BSS TXOP power save mode may be included in the PS-poll frame in diverse information formats and in diverse locations. Moreover, the PPDU header of the PPDU carrying the PS-poll frame may include information on a downlink measurement value and/or information on the other BSS TXOP power save mode.

Referring to FIG. 8, the PS-poll frame may include a downlink measurement field 800 and another BSS TXOP power save mode field 820.

The downlink measurement field 800 may include information on the reception intensity (or downlink measurement value) of the downlink frame, which is transmitted by the AP, that is transmitted by the STA. The downlink measurement value may include the RCPI and RSNI corresponding to the downlink frame.

The downlink measurement value may correspond to a value that was measured based on a beacon frame, which has triggered the transmission of the PS-poll frame. Alternatively, the downlink measurement value may also correspond to a value that is determined based on the downlink measurement value corresponding to a previous downlink frame (e.g., an average value of downlink measurement values corresponding to previous downlink frames).

The other BSS TXOP power save mode field 820 may include information indicating whether or not the STA is to be operated in the other BSS TXOP power save mode. For example, in case the other BSS TXOP power save mode field 820 included in the PS-poll frame is equal to 0, this may indicate that the operation of the STA in the other BSS TXOP power save mode is not performed. Conversely, in case the other BSS TXOP power save mode field 820 included in the PS-poll frame is equal to 1, this may indicate that the STA is operated in the other BSS TXOP power save mode.

More specifically, the STA may set the other BSS TXOP power save mode included in the PS-poll frame to 1, and this may indicate the STA to be operated by transitioning from the awake state to the doze state during a duration, which is configured by the other BSS frame (e.g., duration of a duration field 820 of another BSS frame) when receiving the other BSS frame. At this point, by considering the reception intensity of the other BSS frame, the STA may be operated by transitioning from the awake state to the doze state during a duration, which is configured by the other BSS frame, only in a case when the reception intensity is equal to or greater than a predetermined size. Conversely, the STA may set the other BSS TXOP power save mode included in the PS-poll frame to 0, and this may indicate that the STA is not operated in the other power save mode.

The information included in the downlink measurement field 800 and the information included in the other BSS TXOP power save mode field 820 may be used for negotiating the operation of the STA in the other BSS TXOP power save mode with the AP. As described above, the AP may determine the operation of the STA in the other BSS TXOP power save mode by considering the information included in the downlink measurement value field and the information included in the other BSS TXOP power save mode field 820, which are included in the PS-poll frame. The AP may transmit information on whether or not the operation of the STA in the other BSS TXOP power save mode is authorized to the STA through the ACK frame.

Figure 9:
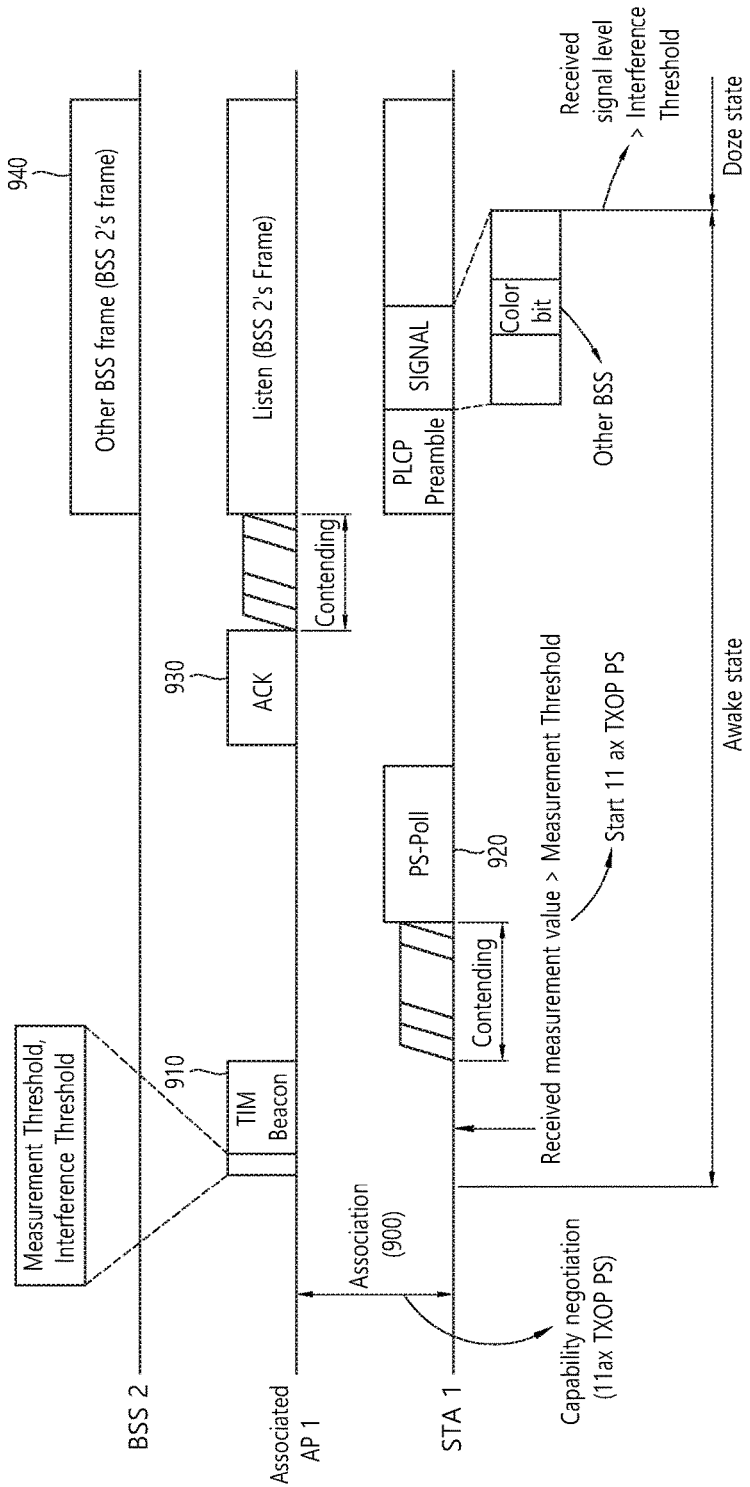
FIG. 9 is a conceptual view illustrating a preliminary procedure for another BSS TXOP power save mode of the STA according to an exemplary embodiment of the present invention.

FIG. 9 is a conceptual view illustrating a preliminary procedure for another BSS TXOP power save mode of the STA according to an exemplary embodiment of the present invention.

FIG. 9 discloses a method for negotiating whether or not operation in the other BSS power save mode is possible through an initial access frame, which is transmitted through an initial access procedure, without any modification in the PS-poll frame structure and the ACK frame structure. Among the initial access frames, a preliminary negotiation procedure for negotiating whether or not the operation in the other BSS TXOP power save mode is possible may be performed by an association request frame, which is transmitted by the STA, and an association response frame, which is transmitted by the AP as a response to the association request frame.

Apart from the association request frame/association response frame, a preliminary negotiation procedure for negotiating whether or not the operation of the STA in the other BSS TXOP power save mode is possible may be performed based on a probe request frame/probe response frame and/or an authentication request frame/authentication response frame.

Referring to FIG. 9, the STA may perform a preliminary negotiation procedure for the operation in the other BSS TXOP power save mode based on an association procedure 900. The STA may transmit information indicating whether or not operation in the other BSS TXOP power save mode is possible to the AP. For example, the association request frame may include information on the other BSS TXOP power save mode, and the information on the other BSS TXOP power save mode may include information on whether or not the operation of the STA in the other BSS TXOP power save mode is possible.

The other BSS TXOP power save mode information may be included as a sub information element that is subsidiary to an extension capability element of the association request frame.

Table 1 shown below represents the other BSS power save mode information that is being included as information subsidiary to the extended capability element of the capability field.

TABLE 1

| Bit | Information | Notes |
|---|---|---|
| | Other BSS TXOP Power Save | 0: This indicates that operation in the other BSS TXOP power save mode is not possible. I.e., this indicates that operation in the other BSS TXOP power save mode is not set up.<br>1: This indicates that operation in the other BSS TXOP power save mode is possible. |

The other BSS power save mode information may also be expressed conversely as shown below in Table 2.

TABLE 2

| Bit | Information | Notes |
|---|---|---|
| | Other BSS NO TXOP Power Save | 0: This indicates that operation in the other BSS TXOP power save mode is possible. I.e., when receiving another BSS frame of the STA, the transition of the STA to the doze state during a duration of the STA is possible.<br>1: This indicates that operation in the other BSS TXOP power save mode is not possible. |

The STA, which has negotiated whether or not the operation in the other BSS TXOP power save mode is possible based on the association request frame/association response frame according to the exemplary embodiment of the present invention, may determine whether or not to be operated in the other BSS TXOP power save mode by additionally considering the reception intensity of the beacon frame 910/the reception intensity of the other BSS frame.

More specifically, after primarily negotiating whether or not the operation of the STA in the other BSS TXOP power save mode is possible based on the association request frame/association response frame, the STA may secondarily determine whether or not to be operated in the other BSS TXOP power save mode by additionally considering the reception intensity of the beacon frame 910/the reception intensity of the other BSS frame 940.

In other words, after the STA has primarily negotiated whether or not the operation in the other BSS TXOP power save mode is possible based on the association request frame/association response frame, the STA may secondarily compare the reception intensity of the beacon frame 910 with a measurement threshold value, which will be described later on, and may secondarily re-determine the operation in the other BSS TXOP power save mode. In case the operation of the STA in the other BSS TXOP power save mode is secondarily determined, the STA may be operated in the other BSS TXOP power save mode, however, the STA may determine whether to transition (or shift) the doze state and the awake state by comparing the reception intensity of the other BSS frame and the interference threshold value, which will be described later on.

The beacon frame 910 being transmitted by the AP may include information on threshold reception intensity of the beacon frame 910 and the other BSS frame 940 for determining whether or not to operate the STA in the other BSS TXOP power save mode. The beacon frame 910 may include information on the measurement threshold value corresponding to the threshold reception intensity of the beacon frame 910 for determining whether or not to operate the STA in the other BSS TXOP power save mode. The beacon frame 910 may include information on an interference threshold value, which corresponds to information on the threshold reception intensity of the other BSS frame 940 for determining whether or not to operate the STA in the other BSS TXOP power save mode.

The measurement threshold value corresponds to a RCPI threshold value and a RSNI threshold value corresponding to the beacon frame 910 for determining whether or not to operate the STA in the other BSS TXOP power save mode.

In case each of the RCPI and the RSNI of the beacon frame 910, which is received by the STA, is equal to or greater than the measurement threshold value (RCPI threshold value, RSNI threshold value), the STA, which has received the beacon frame 910 including the measurement threshold value, may be operated in the other BSS TXOP power save mode. More specifically, in case the RCPI of the beacon frame 910 received by the STA is equal to or greater than the RCPI threshold value, and in case the RSNI of the beacon frame 910 received by the STA is equal to or greater than the RSNI threshold value, the STA, which has received the beacon frame 910, may determine that the reception intensity of the frame that is received by the STA and the reception intensity of the frame that is received by the AP are within a similar range. Accordingly, the STA may be operated in the other BSS TXOP power save mode. In other words, in case the RCPI of the beacon frame 910 received by the STA is equal to or greater than the RCPI threshold value, and in case the RSNI of the beacon frame 910 received by the STA is equal to or greater than the RSNI threshold value, the STA that has received the frame may determine that the distance between the STA and the AP is within a predetermined range. Therefore, the STA may be operated in the other BSS TXOP power save mode.

The STA may transmit information on whether or not to operate the STA in the other BSS TXOP power save mode, which is determined based on the reception intensity of the beacon frame 910, by including the corresponding information in the PS-poll frame 920.

The interference threshold value may correspond to a threshold value that is compared with the reception intensity of the other BSS frame 940 in order to determine the operation of the STA in the other BSS TXOP power save mode. In case the reception intensity of the other BSS frame 940 is greater than the interference threshold value, which is set up by the beacon frame 910, the STA may be operated in the other BSS TXOP power save mode so as to be transitioned to the doze state. In case the reception intensity of the other BSS frame 940 is equal to or smaller than the interference threshold value, which is set up by the beacon frame 910, the STA may not be perform operation in the other BSS TXOP power save mode.

In other words, in case the reception intensity of the other BSS frame 940 is equal to or smaller than a predetermined intensity level, the STA may predict that the interference caused by the other BSS frame 940 between the STA and the AP will be small and may then maintain the awake state without transitioning to the doze state. Conversely, in case the reception intensity of the other BSS frame 940 is greater than the predetermined intensity level, the STA may predict that the interference caused by the other BSS frame 940 between the STA and the AP will be large and may then transition to the doze state.

Instead of the interference level, a clear channel assessment (CCA) level (or CCA sensitivity level) may be used in order to determine the operation of the STA in the other BSS TXOP power save mode. More specifically, in case the reception intensity of the other BSS frame 940 is greater than the CCA level, which is set up, the STA may operate in the other BSS TXOP power save mode so as to be transitioned to the doze state. And, in case the reception intensity of the other BSS frame 940 is smaller than or equal to the CCA level, the STA may not perform operation in the other BSS TXOP power save mode. In case the interference level is not included in the beacon frame 910, the operation of the STA in the other BSS TXOP power save mode may be performed based on the CCA sensitivity level.

Referring back to FIG. 9, the STA may receive the beacon frame 910 and may transmit the PS-poll frame 920 based on the TIM element that is included in the beacon frame 910.

The STA may compare the reception intensity of the beacon frame 910 with the measurement threshold value and may determine whether or not to be operated in the other BSS TXOP power save mode. The information on the operation of the STA in the other BSS TXOP power save mode may be transmitted to the AP through the PS-poll frame 920.

The AP may transmit the ACK frame 930 corresponding to the PS-poll frame 920. And, the AP may perform a contention based channel access in order to transmit a downlink frame including downlink data pending in the STA as a response to the PS-poll frame 920. During the channel access, the AP may receive another BSS frame 940, and, after receiving the ACK frame 930, the STA may also receive another BSS frame 940 while monitoring the downlink frame corresponding to the STA. At this point, the STA may determine whether or not to be operated in the other BSS TXOP power save mode based on the interference threshold value and the reception intensity of the other BSS frame 940. In case the reception intensity of the other BSS frame 940 is greater than the interference threshold value, the STA may be operated in the other BSS TXOP power save mode during a transmission duration, which is set up based on the other BSS frame 940, so as to be transitioned to the doze state. Also, the AP may not transmit a downlink frame during a transmission duration, which is set up based on the other BSS frame 940 by considering the operations of the STA in the other BSS TXOP power save mode based on the interference threshold value and the reception intensity of the other BSS frame 940. Conversely, in case the reception intensity of the other BSS frame 940 is smaller than or equal to the interference threshold value, the STA may perform communication with the AP by maintaining the awake state without operating in the other BSS TXOP power save mode.

According to another exemplary embodiment of the present invention, the STA operating in the other BSS TXOP power save mode may determine whether or not to transition to the doze state or to the awake state based on the interference threshold value and the reception intensity of the other BSS frame 940. In case the reception intensity of the other BSS frame 940 is greater than the interference threshold value, the STA operating in the other BSS TXOP power save mode may be transitioned to the doze state during the transmission duration, which is set up based on the other BSS frame. Conversely, in case the reception intensity of the other BSS frame 940 is smaller than or equal to the interference threshold value, the STA operating in the other BSS TXOP power save mode may perform communication with the AP by maintaining the awake state. More specifically, instead of determining whether or not to be operated in the other BSS TXOP power save mode in accordance with the reception or non-reception of the other BSS frame 940, the STA may be operated in the other BSS TXOP power save mode, however, the STA may also determine whether or not to transition to the doze state or whether or not to maintain the awake state.

FIG. 10 is a conceptual view illustrating operations in another BSS TXOP power save mode of the STA according to an interference threshold value according to an exemplary embodiment of the present invention.

A case when the distance between AP1 1010 and the STA 1000 is within a predetermined threshold distance (or in case when the reception intensity of the other BSS frame that is received by AP1 1010 and the reception intensity of the other BSS frame that is received by the STA 1000 are within a similar range) is assumed in FIG. 10. As described above, the STA 1000 may determine that AP1 1010 is located within a threshold distance of the STA 1000 based on the reception intensity of the beacon frame that is transmitted by AP1 1010.

Referring to (a) of FIG. 10, AP2 1020 may transmit another BSS frame. AP1 1010 may receive another BSS frame at a reception intensity of −79 dBm. The STA 1000 may receive another BSS frame at a reception intensity of −77 dBm.

In case the interference threshold value (or CCA sensitivity level) that is set up by the beacon frame is equal to −72 dBm, since the reception intensity of the other BSS frame is equal to or smaller than the interference threshold value, the STA 1000 is not operated in the other BSS TXOP power save mode and may maintain the awake state. Since the reception intensity of the other BSS frame is equal to or smaller than the interference threshold value, AP1 1010 may also transmit a downlink frame including the pending downlink data to the STA 1000. More specifically, since the reception intensity of the other BSS frame is equal to or smaller than the interference threshold value, AP1 1010 may determine the channel status as being idle and may transmit a downlink frame accordingly. Alternatively, since the reception intensity of the other BSS frame is equal to or smaller than the interference threshold value, AP1 1010 may determine that the STA 1000 is not being operated in the other BSS power save mode and may transmit a downlink frame to the STA 1000 accordingly.

Referring to (b) of FIG. 10, AP2 1020 may transmit another BSS frame. AP1 1010 may receive another BSS frame at a reception intensity of −71 dBm. The STA 1000 may receive another BSS frame at a reception intensity of −70 dBm.

In case the interference threshold value (or CCA sensitivity level) that is set up by the beacon frame is equal to −72 dBm, since the reception intensity of the other BSS frame is greater than the interference threshold value, the STA 1000 is operated in the other BSS TXOP power save mode and may be transitioned to the doze state. Also, since the reception intensity of the other BSS frame is greater than the interference threshold value, AP1 1010 may not transmit a downlink frame including the pending downlink data to the STA 1000. More specifically, since the reception intensity of the other BSS frame is greater than the interference threshold value, AP1 1010 may determine the channel status as being busy and may not transmit a downlink frame accordingly. Alternatively, since the reception intensity of the other BSS frame is greater than the interference threshold value, AP1 1010 may determine that the STA 1000 is being operated in the other BSS power save mode and may transmit a downlink frame to the STA 1000 accordingly.

Figure 11:
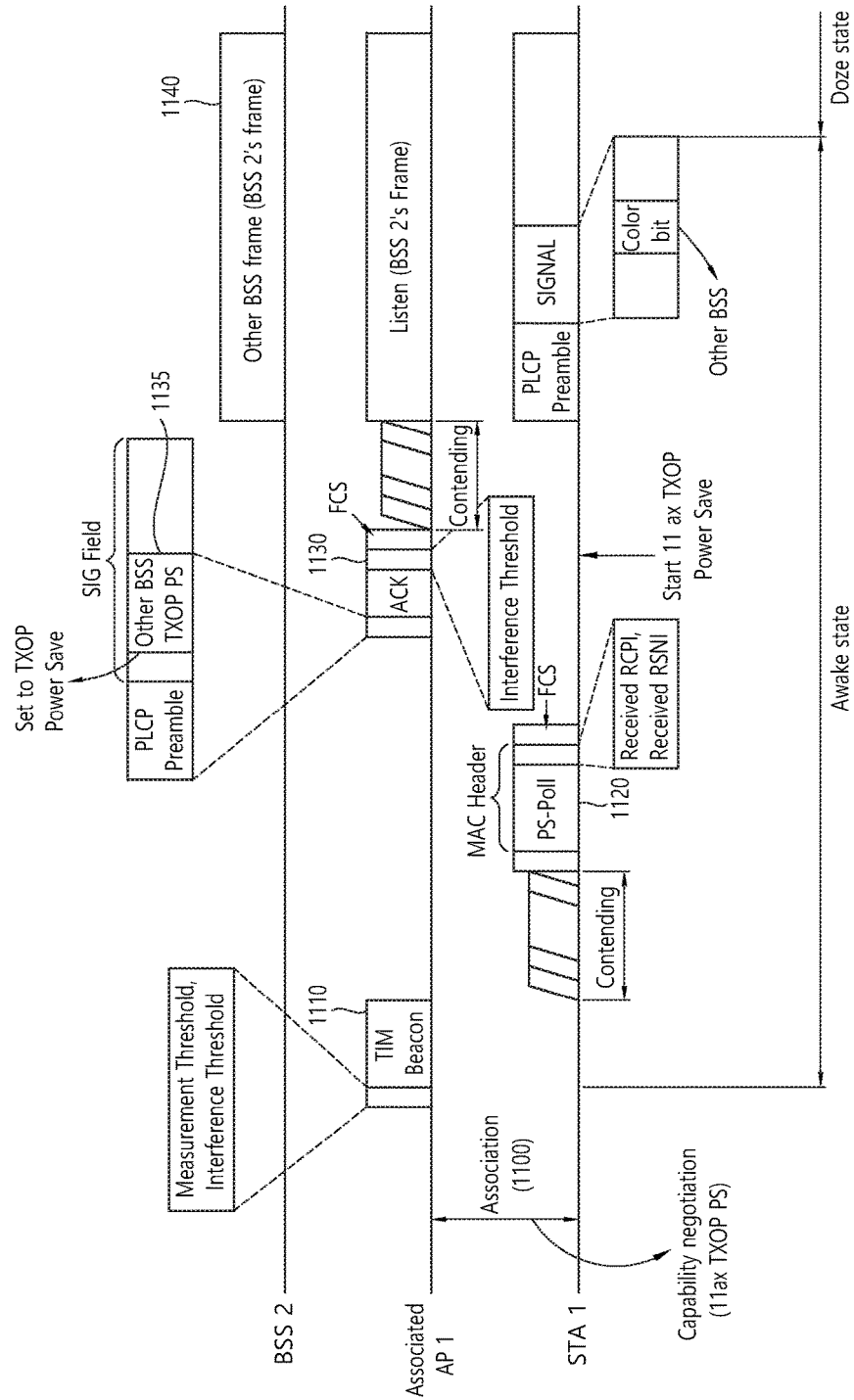
FIG. 11 is a conceptual view illustrating a preliminary procedure for another BSS TXOP power save mode of the STA according to an exemplary embodiment of the present invention.

FIG. 11 is a conceptual view illustrating a preliminary procedure for another BSS TXOP power save mode of the STA according to an exemplary embodiment of the present invention.

In FIG. 11, the STA and AP may negotiate on whether or not it is possible for the STA to be operated in the other BSS TXOP power save mode through an association procedure 1100 based on the association request frame/association response frame. The association request frame may include information indicating whether or not it is possible for the STA to be operated in the other BSS TXOP power save mode. The association response frame may include information indicating whether or not the operation of the STA in the other BSS TXOP power save mode is authorized.

Herein, a case when the operation of the STA in the other BSS TXOP power save mode is determined based on a preliminary negotiation through the association procedure between the STA and the AP is assumed.

The AP may transmit a beacon frame 1110 to the STA. As described above, the beacon frame 1110 may include or may not include information on the measurement threshold value.

The STA may transmit a PS-poll frame 1120 to the AP based on a TIM element that is included in the beacon frame 1110. The STA may transmit information on the downlink measurement value by including the corresponding information in the PS-poll frame 1120. The information on the downlink measurement value that is included in the PS-poll frame 1120 may include information on the measurement values (RCPI value and RSNI value) corresponding to the beacon frame 1110 or information on an average measurement value (RCPI value and RSNI value) corresponding to the previous downlink frames.

The AP may compare the measurement threshold value and the transmitted downlink measurement value that is transmitted through the PS-poll frame 1120. In case the downlink measurement value is greater than the measurement threshold value, the AP may indicate that the operation of the STA in the other BSS TXOP power save mode is possible through the ACK frame 1130. Conversely, in case the downlink measurement value is smaller than or equal to the measurement threshold value, the AP may indicate that the operation of the STA in the other BSS TXOP power save mode is not possible through the ACK frame 1130.

For example, in case another BSS TXOP power save mode field 1135, which is included in the ACK frame 1130, is set to 1, this may indicate that the operation of the STA in the other BSS TXOP power save mode is possible. In case another BSS TXOP power save mode field 1135, which is included in the ACK frame 1130, is set to 0, this may indicate that the operation of the STA in the other BSS TXOP power save mode is not possible.

More specifically, even in a case when the STA has primarily negotiated on whether or not the operation of the STA in the other BSS TXOP power save mode is possible based on the association request frame/association response frame, the AP may secondarily compare the measurement threshold value and the reception measurement value, which is transmitted through the PS-poll frame 1120, and may then determine whether or not to operate the STA in the other BSS TXOP power save mode.

In case the other BSS TXOP power save mode field 1135 that is included in the ACK frame 1130 is set to 1, the STA may be operated in the other BSS TXOP power save mode.

Also, the ACK frame 1130 may include information on the interference threshold value.

The interference threshold value may correspond to a threshold value that is compared with the reception intensity of another BSS frame 1140 of the STA in order to determine the operation of the STA in the other BSS TXOP power save mode. In other words, the interference threshold value may correspond to a threshold value that is compared with the reception intensity of another BSS frame 1140 of the STA in order to determine whether or not the STA, which is being operated in the other BSS TXOP power save mode, is to be transitioned to the doze state.

In case the reception level (or intensity) of the other BSS frame 1140 that is received by the STA is greater than the interference threshold value that is included in the ACK frame 1130, the STA may be transitioned to the doze state during a transmission duration, which is set up based on the other BBS frame 1140, thereby being capable of saving power. Conversely, in case the reception level of the other BSS frame 1140 that is received by the STA is smaller than or equal to the interference threshold value that is included in the ACK frame 1130, the STA may maintain the awake state and may perform communication with the AP.

In case the interference threshold value is not included in the ACK frame 1130, the STA may determine whether or not to be transitioned to the doze state based on the CCA sensitivity level.

Figure 12:
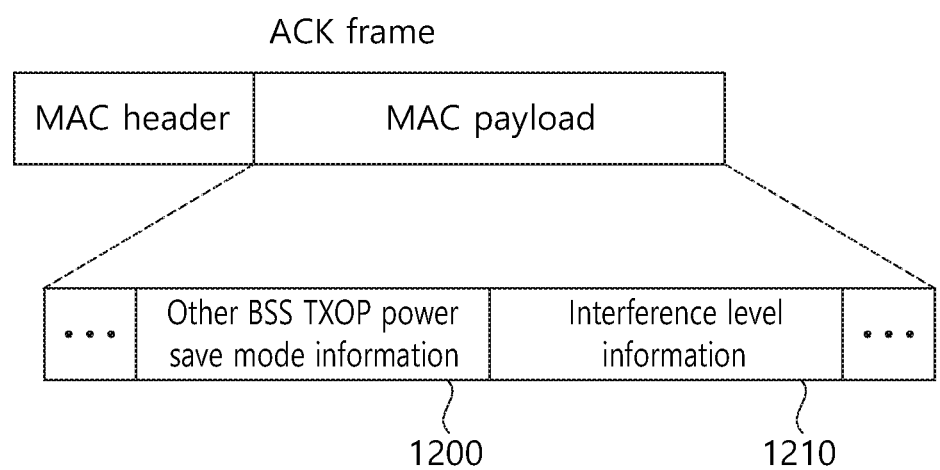
FIG. 12 is a conceptual view illustrating an ACK frame according to an exemplary embodiment of the present invention.

FIG. 12 is a conceptual view illustrating an ACK frame according to an exemplary embodiment of the present invention.

Referring to FIG. 12, the ACK frame may include information on the other BSS TXOP power save mode and information on the interference level.

In FIG. 12, it is assumed that the MAC payload of the ACK frame includes the other BSS TXOP power save mode information 1200 and the interference level information 1210. However, the other BSS TXOP power save mode information and the interference level information may also be included in the MAC header of the ACK frame and the PPDU header of the PPDU carrying the ACK frame.

The other BSS TXOP power save mode information 1200 may include information on whether or not the operation of the STA in the other BSS TXOP power save mode is possible. The STA may determine whether or not to be operated in the other BSS TXOP power save mode based on the other BSS TXOP power save mode information 1200.

The interference level information 1210 may include information on the interference threshold value that is compared with the reception level of the other BSS frame in order to determine whether or not to transition the STA to the doze state.

Figure 13:
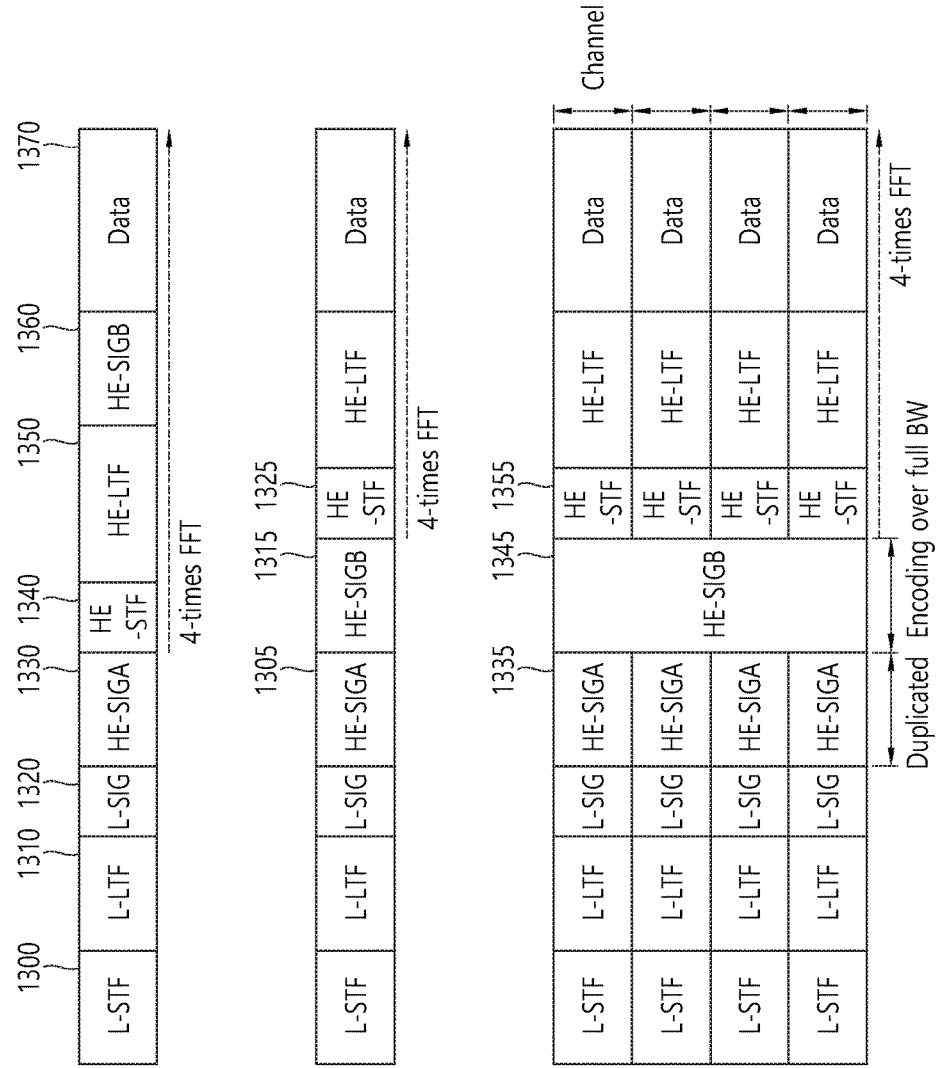
FIG. 13 is a conceptual view illustrating a PPDU format carrying a frame according to an exemplary embodiment of the present invention.

FIG. 13 is a conceptual view illustrating a PPDU format carrying a frame according to an exemplary embodiment of the present invention.

FIG. 13 discloses a PPDU format according to the exemplary embodiment of the present invention. A PPDU may include a PPDU header and a MAC protocol data unit (MPDU) (or physical layer service data unit (PSDU)). A frame may correspond to a MPDU. The PPDU header of the PPDU format may be used as a meaning of including a PHY header and a PHY preamble of the PPDU format.

The PPDU format disclosed in FIG. 13 may be used for carrying (or delivering) the above-described frames (e.g., initial access frame (e.g., beacon frame, association request/response frame, etc), PS-poll frame, other BSS frame, ACK frame, and so on).

Referring to the upper part of FIG. 13, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1300 may include a short training orthogonal frequency division multiplexing (OFDM) symbol. The L-STF 1300 may be used for frame detection, automatic gain control (AGC), diversity detection, and coarse frequency/time synchronization.

The L-LTF 1310 may include a long training orthogonal frequency division multiplexing (OFDM) symbol. The L-LTF 1310 may be used for fine frequency/time synchronization and channel prediction.

The L-SIG 1320 may be used for transmitting control information. The L-SIG 1320 may include information on data transmission rate, data length, and so on.

The HE-SIG A 1330 may also include identification information of the STA for indicating a target STA that is to receive the downlink PPDU. The STA may determine whether or not to receive a PPDU based on the identification information of the target STA, which is included in the HE-SIG A 1330. In case a STA is indicated based on the HE-SIG A 1330 of the downlink PPDU, the STA may perform additional decoding on the downlink PPDU. Additionally, the HE-SIG A 1330 may also include information on a resource (frequency resource (or subband) (when performing transmission based on orthogonal frequency division multiplexing access (OFDMA) or space-time stream resource (when performing transmission based on multiple input multiple output (MIMO)) that is to receive downlink data.

Additionally, the HE-SIG A 1330 may also include color bits information for BSS identification information, bandwidth information, tail bit, CRC bit, modulation and coding scheme (MCS) information on the HE-SIG B 1360, information on the number of symbols for the HE-SIG B 1360, and cyclic prefix (CP) (or guard interval (GI)) length information.

Additionally, the HE-SIG A 1330 may include uplink transmission indication information and BSS identification information (e.g., color bit, PBSSID) for determining whether or not to transition the STA, which is operating in the other BSS TXOP power save mode, to the doze state.

The HE-STF 1340 may be used for enhancing automatic gain control estimation in a MIMO environment or an OFDMA environment.

The HE-LTF 1350 may be used for estimating a channel in a MIMO environment or an OFDMA environment.

The HE-SIG B 1360 may include information on a length modulation and coding scheme (MCS) of a physical layer service data unit (PSDU) for each STA and a tail bit, and so on.

The inverse fast fourier transform (IFFT) size being applied to the HE-STF 1340 and the field after the HE-STF 1340 may be different from the IFFT size being applied to the field before the HE-STF 1340. For example, the IFFT size being applied to the HE-STF 1340 and the field after the HE-STF 1340 may be 4 times larger than the IFFT size being applied to the field before the HE-STF 1340. In case the STA receives the PPDU, the STA may decode the HE-SIG A 1330 of the PPDU and may then determine whether or not to perform decoding of the field after the HE-SIG A 1330 based on the identifier information of the target STA included in the HE-SIG A 1330. In this case, in case the identifier information of the target STA included in the HE-SIG A 1330 indicates the identifier of the STA, the STA may perform decoding based on the FFT size, which is changed starting from the HE-STF 1340 and the field after the HE-STF 1340. Conversely, in case the identifier information of the target STA included in the He-SIG A 1330 does not indicate an identifier of the STA, the STA may stop the decoding process and may perform network allocation vector (NAV) configuration. A cyclic prefix (CP) of the HE-STF 1340 may have a size that is larger than the CP of other fields, and, during such CP period, the STA may change the FFT size and may perform decoding on the downlink PPDU.

The order of the fields configuring the format of the PPDU shown in the upper part of FIG. 13 may also be changed. For example, as shown in the middle part of FIG. 13, the HE-SIG B 1315 may be positioned immediately after the HE-SIG A 1305. The STA may perform decoding up to the HE-SIG A 1305 and the HE-SIG B 1315 and may receive the required control information and may then perform NAV configuration. Similarly, the inverse fast fourier transform (IFFT) size being applied to the HE-STF 1325 and the field after the HE-STF 1325 may be different from the IFFT size being applied to the field before the HE-STF 1325.

The STA may receive the HE-SIG A 1305 and the HE-SIG B 1315. In case the reception of the downlink PPDU is indicated by the identifier of the target STA of the HE-SIG A 1305, the STA may change the FFT size starting from the HE-STF 1325 and may then perform decoding on the downlink PPDU. Conversely, the STA may receive the HE-SIG A 1305, and, in case the reception of the downlink PPDU is not indicated based on the HE-SIG A 1305, the NAV configuration may be performed.

Referring to the lower part of FIG. 13, a downlink PPDU format for the downlink (DL) multi-user (MU) transmission is disclosed. The downlink PPDU may be transmitted to the STA through different downlink transmission resources (frequency resources or spatial streams) based on the OFDMA. More specifically, downlink data may be transmitted to multiple STAs through multiple subbands based on the downlink PPDU format for the DL MU transmission.

Within the downlink PPDU, the fields before the HE-SIG B 1345 may each be transmitted from different downlink transmission resources in duplicated forms. The HE-SIG B 1345 may be transmitted in an encoded form over the entire transmission resources. The fields after the HE-SIG B 1345 may include individual information for each of the multiple STAs receiving the downlink PPDU.

In case each of the fields included in the downlink PPDU is transmitted through each downlink transmission resource, the CRC for each field may be included in the downlink PPDU. Conversely, in case a specific field included in the downlink PPDU is encoded and transmitted over the entire downlink transmission resource, the CRC for each field may not be included in the downlink PPDU. Therefore, the overhead for the CRC may be reduced. More specifically, the downlink PPDU format for the DL MU transmission according to the exemplary embodiment of the present invention may reduce the CRC overhead of the downlink frame by using an encoded form of the HE-SIG B 1345 within the entire transmission resource.

Similarly, in the downlink PPDU format for the DL MU transmission, the HE-STF 1355 and the field after the HE-STF 1355 may also be encoded based on an IFFT size that is different from the field before the HE-STF 1355. Therefore, in case the STA receives the HE-SIG A 1335 and the HE-SIG B 1345 and receives an indication on the reception of the downlink PPDU based on the HE-SIG A 1335, the STA may change the FFT size starting from the HE-STF 1355 and may then perform decoding on the downlink PPDU.

Figure 14:
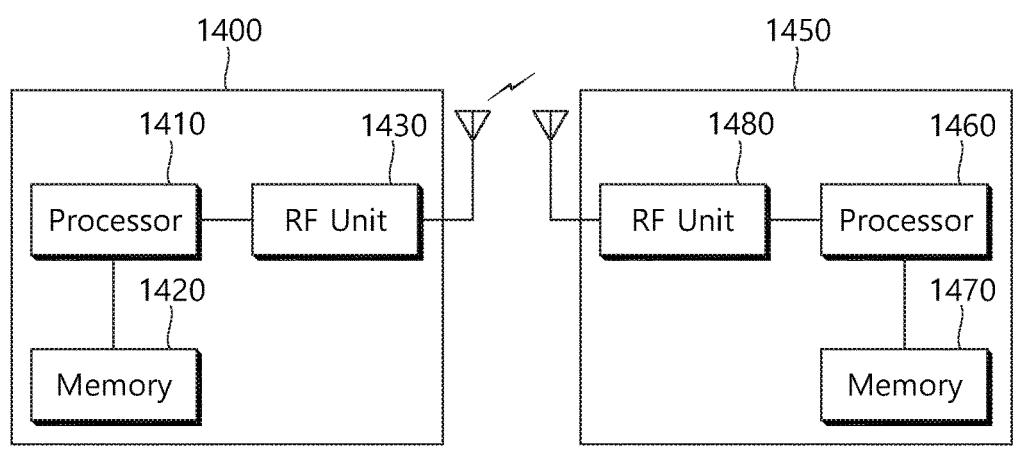
FIG. 14 is a block view illustrating a wireless device to which the exemplary embodiment of the present invention can be applied.

FIG. 14 is a block view illustrating a wireless device to which the exemplary embodiment of the present invention can be applied.

Referring to FIG. 14, as an STA that can implement the above-described exemplary embodiment, the wireless device 1400 may correspond to an AP 1400 or a non-AP station (STA) 1450.

The AP 1400 includes a processor 1410, a memory 1420, and a radio frequency (RF) unit 1430.

The RF unit 1430 is connected to the processor 1410, thereby being capable of transmitting and/or receiving radio signals.

The processor 1410 implements the functions, processes, and/or methods proposed in the present invention. For example, the processor 1410 may be implemented to perform the operations of the wireless device according to the above-described exemplary embodiments of the present invention. The processor may perform the operations of the wireless device, which are disclosed in the exemplary embodiments of FIG. 1 to FIG. 13.

For example, the processor 1410 may be configured to transmit a beacon frame including information on the measurement threshold value and information on the interference threshold value. Additionally, the processor 1410 may determine whether or not the operation of the STA in the other BSS TXOP power save mode is authorized based on the information on the downlink measurement value corresponding to the beacon frame and the information on whether or not the STA is being operated in the other BSS TXOP power save mode, which are included in the PS-poll frame. Furthermore, the processor 1410 may be configured to transmit the information on whether or not the operation of the STA in the other BSS TXOP power save mode is authorized to the STA through the ACK frame.

The STA 1450 includes a processor 1460, a memory 1470, and a radio frequency (RF) unit 1480.

The RF unit 1480 is connected to the processor 1460, thereby being capable of transmitting and/or receiving radio signals.

The processor 1460 implements the functions, processes, and/or methods proposed in the present invention. For example, the processor 1460 may be implemented to perform the operations of the wireless device according to the above-described exemplary embodiments of the present invention. The processor may perform the operations of the wireless device, which are disclosed in the exemplary embodiments of FIG. 1 to FIG. 13.

For example, the processor 1460 receives the beacon frame from the AP, wherein the beacon frame includes a traffic indication map (TIM) element indicating downlink data pending in the STA, and the processor 1460 may be configured to transmit a power saving (PS)-poll frame to the AP as a response to the beacon frame. Additionally, the processor 1460 may be configured to receive an acknowledgement (ACK) frame, which is transmitted by the AP as a response to the PS-poll frame, and to determine whether or not to be operated in the other basic service set (BSS) transmission opportunity (TXOP) power save mode based on the received ACK frame.

The PS-poll frame may include information on a downlink measurement value corresponding to the beacon frame and information on whether or not the STA is operated in the other BSS TXOP power save mode. The ACK frame may include information on whether or not the operation of the STA in the other BSS TXOP power save mode is authorized based on the downlink measurement information and the information on whether or not the STA is to be operated in the other BSS TXOP power save mode. Furthermore the other BSS TXOP power save mode may determine whether or not to transition the STA to the awake state or the doze state based on another BSS frame, which is transmitted by another STA or another AP being included in another BSS that does not include the current STA and AP.

The processor 1410 and 1460 may include an application-specific integrated circuit (ASIC), another chip set, a logical circuit, a data processing device, and/or a converter converting a baseband signal and a radio signal to and from one another. The memory 1420 and 1470 may include a read-only memory (ROM), a random access memory (RAM), a flash memory, a memory card, a storage medium, and/or another storage device. The RF unit 1430 and 1480 may include one or more antennas transmitting and/or receiving radio signals.

When the exemplary embodiment is implemented as software, the above-described method may be implemented as a module (process, function, and so on) performing the above-described functions. The module may be stored in the memory 1420 and 1470 and may be executed by the processor 1410 and 1460. The memory 1420 and 1470 may be located inside or outside of the processor 1410 and 1460 and may be connected to the processor 1410 and 1460 through a diversity of well-known means.

What is claimed is:

1. A method for a power save mode operation of a station (STA) in a wireless LAN, comprising:
receiving, by the STA, a beacon frame from an access point (AP), the beacon frame including a traffic indication map (TIM) element indicating downlink data pending in the STA;
transmitting, by the STA, a power saving (PS)-poll frame to the AP as a response to the beacon frame;

receiving, by the STA, an acknowledgement (ACK) frame transmitted from the AP as a response to the PS-poll frame; and determining, by the STA, another basic service set (BSS) transmission opportunity (TXOP) power save mode operation based on the ACK frame, wherein the PS-poll frame includes information on a downlink measurement value corresponding to the beacon frame and information on a capability of the other BSS TXOP power save mode operation of the STA, wherein the ACK frame includes information on whether or not the other BSS TXOP power save mode operation of the STA is authorized, the information being determined based on the information on the downlink measurement value and the information on the capability of the other BSS TXOP power save mode operation of the STA, and wherein the other BSS TXOP power save mode operation determines a transition of the STA to an awake state or a doze state based on another BSS frame transmitted by another STA or another AP being included in another BSS, wherein the other BSS does not include the STA and the AP.

2. The method of claim 1, further comprising:
after receiving the ACK frame by the STA, receiving the other BSS frame, by the STA, through a channel; and
in case the STA has received the other BSS frame, transitioning the STA to a doze state that is based on the other BSS TXOP power save mode operation.

3. The method of claim 1, further comprising:
after receiving the ACK frame by the STA, receiving the other BSS frame, by the STA, through a channel; and
determining, by the STA, whether or not to transition to the doze state based on the other BSS TXOP power save mode operation by comparing a reception intensity and interference threshold value of the other BSS frame.

4. The method of claim 3, wherein the step of determining whether or not to transition to the doze state comprises:
in case the reception intensity of the other BSS frame is greater than the interference threshold value, determining, by the STA, to transition to the doze state; and
in case the reception intensity of the other BSS frame is equal to or smaller than the interference threshold value, determining, by the STA, to maintain the awake state.

5. The method of claim 1, wherein the information on the downlink measurement value corresponding to the beacon frame includes a received channel power indicator (RCPI) and a received signal to noise indicator (RSNI) corresponding to the beacon frame.

6. A station (STA) operating based on a power save mode operation in a wireless LAN, comprising:
a radio frequency (RF) unit configured to transmit or receive radio signals; and
a processor being operatively connected to the RF unit, wherein the processor is configured:
to receive a beacon frame from an access point (AP), the beacon frame including a traffic indication map (TIM) element indicating downlink data pending in the STA,
to transmit a power saving (PS)-poll frame to the AP as a response to the beacon frame,
to receive an acknowledgement (ACK) frame transmitted from the AP as a response to the PS-poll frame, and
to determine another basic service set (BSS) transmission opportunity (TXOP) power save mode operation based on the ACK frame,
wherein the PS-poll frame includes information on a downlink measurement value corresponding to the beacon frame and information on a capability of the other BSS TXOP power save mode operation of the STA,
wherein the ACK frame includes information on whether or not the other BSS TXOP power save mode operation of the STA is authorized, the information being determined based on the information on the downlink measurement value and the information on the capability of the other BSS TXOP power save mode operation of the STA, and
wherein the other BSS TXOP power save mode operation determines a transition of the STA to an awake state or a doze state based on another BSS frame transmitted by another STA or another AP being included in another BSS, wherein the other BSS does not include the STA and the AP.

7. The STA of claim 6, wherein the processor is configured:
to receive the other BSS frame through a channel after receiving the ACK frame by the STA, and
to transition the STA to a doze state that is based on the other BSS TXOP power save mode operation in case the STA has received the other BSS frame.

8. The STA of claim 6, wherein the processor is configured:
to receive the other BSS frame through a channel after receiving the ACK frame by the STA, and
to determine whether or not to transition to the doze state based on the other BSS TXOP power save mode operation by comparing a reception intensity and interference threshold value of the other BSS frame.

9. The STA of claim 8, wherein, in order to determine whether or not to transition to the doze state, the process is configured:
to determine to transition to the doze state, in case the reception intensity of the other BSS frame is greater than the interference threshold value, and
to determine to maintain the awake state, in case the reception intensity of the other BSS frame is equal to or smaller than the interference threshold value.

10. The STA of claim 6, wherein the information on the downlink measurement value corresponding to the beacon frame includes a received channel power indicator (RCPI) and a received signal to noise indicator (RSNI) corresponding to the beacon frame.

* * * * *